US006546596B2

(12) United States Patent
Grote et al.

(10) Patent No.: US 6,546,596 B2
(45) Date of Patent: Apr. 15, 2003

(54) EXTENSION POLE FOR TOOLS

(76) Inventors: Rick V. Grote, P.O. Box 926, Eugene, OR (US) 97440; Cynthia L. Grote, P.O. Box 926, Eugene, OR (US) 97440

( * ) Notice: Subject to any disclaimer, the term of this patent is extended or adjusted under 35 U.S.C. 154(b) by 0 days.

(21) Appl. No.: 09/755,076

(22) Filed: Jan. 8, 2001

(65) Prior Publication Data

US 2002/0088091 A1 Jul. 11, 2002

(51) Int. Cl.[7] .................................................. F16L 5/00

(52) U.S. Cl. .......................... 16/429; 16/113.1; 16/436; 16/DIG. 25; 16/DIG. 41; 403/901.4; 403/901.1; 403/13; 15/143.1; 15/144.4; 15/DIG. 10

(58) Field of Search .......................... 16/429, 115, 427; 81/489; 403/377, 378, 109.1–109.6, 379, 305; 40/612; 463/47.7; 287/58

(56) References Cited

U.S. PATENT DOCUMENTS

| | | | | | |
|---|---|---|---|---|---|
| 2,134,301 | A | | 10/1938 | Guggenbuehler | |
| 2,595,597 | A | | 5/1952 | Morseth | |
| 3,243,837 | A | | 4/1966 | Smith | |
| 3,306,639 | A | * | 2/1967 | Lyon | 287/58 |
| 3,347,575 | A | | 10/1967 | Morris | |
| 3,380,097 | A | | 4/1968 | Pharris | |
| 3,407,424 | A | | 10/1968 | Lanzarone et al. | |
| 3,603,623 | A | * | 9/1971 | Widman | 287/58 CT |
| 3,722,903 | A | | 3/1973 | Jones | |
| 4,435,105 | A | * | 3/1984 | Rampley | 403/109 |
| 4,524,484 | A | * | 6/1985 | Graham | 16/115 |
| 4,926,522 | A | * | 5/1990 | Wang | 16/144 |
| 5,335,949 | A | * | 8/1994 | Maury et al. | 282/338 |
| 5,339,916 | A | * | 8/1994 | Louis | 180/19.3 |
| 5,425,593 | A | * | 6/1995 | Buehler | 403/305 |
| 5,579,558 | A | | 12/1996 | Newman, Jr. et al. | |
| 5,617,980 | A | * | 4/1997 | Parsons et al. | 224/251 |
| 5,625,923 | A | * | 5/1997 | Huang | 16/115 |
| 5,682,641 | A | | 11/1997 | Newman, Jr. et al. | |
| 5,729,865 | A | | 3/1998 | Stoddart | |
| 5,743,577 | A | | 4/1998 | Newman, Jr. et al. | |
| 5,868,621 | A | * | 2/1999 | Parsons | 463/47.7 |
| 5,887,314 | A | * | 3/1999 | Jordan | 16/115 |
| 5,983,455 | A | * | 11/1999 | Polzin et al. | 16/429 |
| 6,056,643 | A | * | 5/2000 | Wilmoth | 463/47.7 |
| 6,311,368 | B1 | * | 11/2001 | Sartori | 16/429 |
| 6,349,451 | B1 | * | 2/2002 | Newman et al. | 16/427 |

FOREIGN PATENT DOCUMENTS

| | | |
|---|---|---|
| GB | 2220163 | 1/1990 |

OTHER PUBLICATIONS

Symonds, John et al., Marks' Standard Handbook for Mechanical Engineers, McGraw–Hill, tenth edition, chapter 5.*

* cited by examiner

*Primary Examiner*—Anthony Knight
*Assistant Examiner*—Lisa Bannapradist
(74) *Attorney, Agent, or Firm*—Richard C. Litman

(57) ABSTRACT

An extension pole for tools provides nearly universal attachment of a wide variety of different tool heads or components, for painting, cleaning, and other tasks which may require a long reach to access otherwise inaccessible areas. The present extension essentially comprises a tubular base or handle component and a tubular extension component. The extension tube telescopes within the base tube and may be locked at the desired extended length by a pull release pin which extends through a selected one of several holes in a keyway in the extension tube. The distal end of the handle tube includes a folded down tab which engages the extension tube keyway, to preclude axial rotation of the extension tube within the base tube. The distal end of the extension tube includes a threaded attachment, preferably having an Acme threaded configuration to provide nearly universal attachment of a wide variety of devices.

1 Claim, 4 Drawing Sheets

EXTENSION POLE FOR TOOLS

BACKGROUND OF THE INVENTION

1. Field of the Invention

The present invention relates generally to extension devices and handles, and more particularly to a telescoping extension pole for painting, cleaning, and other tools as desired. The present extension pole includes a tubular base pole and extension, with the extension tube having a longitudinal keyway or channel formed therein. The base tube includes a guide tab which engages the channel of the extension, for maintaining axial alignment of the two tubes. Different tools may be interchangeably installed upon the distal end of the extension element.

2. Description of the Related Art

It is often necessary to access high or hard to reach locations when painting, cleaning, or performing various other maintenance chores. Workers often use stepladders, chairs, or other convenient articles to stand on for access to higher, difficult to reach areas. However, many of these devices are not particularly safe for such use, and while many ladders have been constructed specifically for the purpose and which are relatively safe for use, it is necessary to step down, reposition the ladder or other support, and again climb up the ladder or support, every few feet during the course of the job.

A popular response to the above problem has been the development of the extension pole. Many variations of such poles have been developed, with those most closely related to the present invention and known to the present inventors being discussed further below. All of the extensions known to the present inventors have various drawbacks, such as a lack of positive locking of the extended length of the two extension elements; lack of rigidity of the extension device, particularly when extended; and lack of versatility for the interchangeable attachment of various different types of tools and devices to the extension.

Accordingly, the present invention responds to these prior art deficiencies by providing an extension with a positive lock between the two telescoping sections of the device. The distal end of the extension also includes a standard threaded fitting for the interchangeable installation of a large number of different tools and accessories thereon, and may include an internally threaded socket in the end of the fitting for even greater versatility. The present extension also provides greater rigidity than most devices of the prior art, with the heavier walled tube of the extension portion having relatively high stiffness compared to many other such devices. The extension keyway or channel and mating guide tab of the base pole assure that a tool secured to the distal extension end is held in the desired orientation at all times.

A discussion of the related art of which the present inventors are aware, and its differences and distinctions from the present invention, is provided below.

U.S. Pat. No. 2,134,301 issued on Oct. 25, 1938 to Carl F. Guggenbuehler, titled "Universal Utility Extension Mop," describes an extension handle having a solid cylindrical base portion with a pair of opposed external longitudinal slots formed therein. A corresponding pair of wire rods slides longitudinally in the slots, and are retained therein by a collar at the distal end of the base cylinder and another collar secured to the proximal ends of the wire rods, which slides along the base cylinder. The only point of commonality between this device and the present invention, is the use of a pull release locking pin by Guggenbuehler. Otherwise, the Guggenbuehler device teaches away from the present invention, in that: (a) the distal rods pass along the outside of the solid cylinder, whereas the extension tube of the present device passes inside the tubular base portion; (b) the locking arrangement is affixed to the distal rod portion, rather than to the distal end of the base handle portion, where it always remains in the same position relative to the user holding the base handle; (c) the wire rod extension configuration of the Guggenbuehler device is purposely constructed for flexibility in order to reach beneath furniture for dusting (col. 1, lines 5–9), whereas the present device is constructed to provide a relatively rigid configuration, even when extended; and (d) the wire rod and end clamp arrangement of the Guggenbuehler device, precludes threaded attachment of a tool thereto, whereas the present invention utilizes a universal Acme threaded end for interchangeable installation of a variety of tools and devices.

U.S. Pat. No. 2,595,597 issued on May 6, 1952 to Richard H. Morseth, titled "Telescoping Handle," describes a handle for a dip net, with the net frame comprising a wire bow with its ends secured to the distal extension portion of the device. No means is provided for the interchangeable, threaded attachment of different devices to the distal extension portion of the Morseth net assembly. Moreover, Morseth does not provide any means for locking the extension of his handle at any specific length, whereas the present invention includes locking means for the assembly. Also, Morseth prevents relative axial rotation of the two components by a hexagonal fitting on the end of the internally telescoping component, with the flats of the hexagonal fitting engaging a series of inwardly disposed protuberances at the distal end of the handle portion of the device. Thus, relative radial rotation of the two telescoping components is only precluded at their maximum extended length, whereas the telescoping components of the present invention are precluded from relative axial rotation at any range or point of extension.

U.S. Pat. No. 3,243,837 issued on Apr. 5, 1966 to Joseph D. Smith, titled "Retractable Handle Assembly," describes a relatively complex pushbutton controlled handle. The Smith device includes means for locking it in either an extended or retracted position, whereas the present pull release lock is always urged to an extended position to engage one of the holes in the extension component. In any event, Smith does not disclose any form of telescoping components or tool extensions with his handle.

U.S. Pat. No. 3,347,575 issued. on Oct. 17, 1967 to Lowell H. Morris, titled "Detent Guide For Telescopic Tube Units," describes an assembly using two concentric tubes. The locking detent is installed within the inner tube, rather than to the outside of the outer tube, as in the present invention. This results in the same drawback as noted further above in the Guggenbuehler '301 U.S. patent, in that the release button is variably positioned relative to the base handle which is being held by the person using the device. Every extension length, results in the release button being positioned at some different point along the length of the base tube. The present invention has the locking control disposed to the outside of the base tube being held by the person using the device, so the lock is always in the same relative location.

U.S. Pat. No. 3,380,097 issued on Apr. 30, 1968 to John A. Pharris, titled "Extension Handle For Paint Roller," describes a device having two concentric tubes for the primary structure. However, Pharris uses a concentric collet lock to secure the relative positions of the two tubes, rather than the positive lock pin of the present invention. The concentric collet locking means of the Pharris extension handle, does not provide the positive locking means of the transverse locking pin used in the present invention; such collet type clamping locks often slip when tension or compression is applied along the length of the handle.

U.S. Pat. No. 3,407,424 issued on Oct. 29, 1968 to Otto R. Lanzarone et al., titled "Adjustable, Extensible, Telescopic And Collapsible Handle For Attachment To Household Cleaning Devices," describes a handle having a series of concentric tubes, with the larger diameter tube located at the accessory attachment end, rather than at the manipulating end. This configuration is essentially the reverse of that of the present invention, with its smaller tube disposed inside the larger diameter tubular portion which is held by the user. While the detent latches are disposed on the larger diameter tubes, these are the components which are relatively movable compared to the smaller diameter handle end, resulting in the detents being variably positioned along the length of the device as it is telescoped, which problem was noted above in the Guggenbuehler '301 and Morris '575 U.S. patents.

U.S. Pat. No. 3,722,903 issued on Mar. 27, 1973 to John P. Jones, titled "Adjustable Ski Pole With Split Retainer Ring," describes a telescoping pole formed of a pair of concentric tubes. Jones recognizes the problem of non-positive locking provided by collet locking means, and accordingly provides a series of grooves in the smaller pole, which engage a ring clamped therein by tightening the collet. Thus, the Jones pole is not infinitesimally adjustable, negating the value of the collet type locking mechanism. In any event, Jones does not provide for any means of interchanging any component (e. g., the "basket") at the distal end of the pole.

U.S. Pat. No. 4,524,484 issued on Jun. 25, 1985 to John W. Graham, titled "Extension Handle Having Cooperating Male And Female Locking Sleeves," describes an assembly having the same basic configuration as the device of the Pharris '097 U.S. patent, discussed further above. The Graham extension is formed of two concentric tubes, which in turn are formed of rolled sheet metal material with closure seams. A plastic collet assembly is used to lock the telescoped length of the assembly as desired. The drawbacks of collet type locking means has been noted further above, and this is particularly true when lighter materials, such as plastics, are used. While Graham states that the outer tube cannot rotate relative to its collet component, little is done to reclude rotation of the smaller diameter tube within the larger diameter tube; this is a problem with most concentric tubular structures.

U.S. Pat. No. 5,579,558 issued on Dec. 3, 1996 to Robert D. Newman, Jr. et al., titled "Tool Handle With Locking Assembly," describes a single tubular handle having a transverse locking pin at its distal end, for interchangeably securing specially adapted tools thereto. The locking assembly uses a different principle than that of the present invention, i. e. a concentric overcenter actuation, wherein pressure on the center of the lock button springs the lock pin outwardly from engagement. Newman, Jr. et al. use this lock to secure a tool to the tubular end of their extension, rather than providing a permanent threaded end on the extension for interchangeably attaching threaded tools.

U.S. Pat. No. 5,682,641 issued on Nov. 4, 1997 to Robert D. Newman, Jr. et al., titled "Tool Handle With Locking Assembly," describes a modification of the tool head attachment means described in the '558 U.S. patent to the same inventors, discussed immediately above. The '641 patent describes an annular groove about the tool head fitting which fits in the socket and is retained therein by the transverse pin engaging the groove. The same points of distinction noted above in the discussion of the '558 U.S. patent to the same inventors are also felt to apply here.

U.S. Pat. No. 5,729,865 issued on Mar. 24, 1998 to Kenneth R. Stoddart, titled "Lock For Telescoping Extension Poles," describes a radially disposed lock pin which is lifted by a linkage connected to an axially sliding component. The arrangement is considerably more complex than the present radial lock pin, which is pulled radially from the outer tube to release the inner tube. Also, while Stoddart provides two concentric tubes with the smaller diameter tube having a longitudinal slot formed therein, it is noted that the cross section views of FIGS. 3 and 4 of Stoddart clearly show the wall thickness of the smaller diameter tube as being thinner than the thickness of the larger outer tube. This teaches away from a stiff structure, as the bending resistance of a tube is dependent upon both diameter and wall thickness; smaller diameters require larger wall thicknesses to provide the same degree of stiffness as a larger diameter tube. The present pole structure is reversed, with the smaller diameter tube preferably having a thicker wall to provide the desired stiffness.

U.S. Pat. No. 5,743,577 issued on Apr. 28, 1998 to Robert D. Newman, Jr. et al., titled "Extension Handle Apparatus," describes a concentric tubular apparatus wherein a radially disposed lock pin rides in a slot formed through the inner tube. The lock pin bears against (but does not penetrate) the opposite inner wall of the inner tube. The lock pin is selectively urged against the inner wall by rotating an eccentric grip disposed about the outer tube and outer end of the lock pin. This arrangement is not applicable to the present extension assembly, with its slotted, but closed, cylindrical configuration for the innermost tube.

U.S. Pat. No. 5,983,455 issued on Nov. 16, 1999 to Bruce C. Polzin et al., titled "Multi-Faceted Extension Pole," describes two different embodiments of such a device. In one embodiment, a threaded collet is used to secure the two tubes positionally as desired. The other embodiment describes a radial pin type latch mechanism, with the pin being actuated by a lever system, rather than a radially outward pull to disengage the pin, as in the present invention.

Finally, British Patent Publication No. 2,220,163 published on Jan. 4, 1990 to Benny Li Tung, titled "Telescopic Handles," describes a device having two concentric tubes with an eccentric disposed within the juncture of the two tubes. Rotating the tubes relative to one another forces the eccentric against the inner wall of one of the tubes, locking the two tubes together.

None of the above inventions and patents, either singly or in combination, is seen to describe the instant invention as claimed.

SUMMARY OF THE INVENTION

The present invention is an extension pole for tools of various sorts, such as paint rollers, cleaning brushes or brooms, squeegees, etc. The present extension tool or pole essentially comprises a cylindrical tubular base or handle portion, with a smaller diameter longitudinally keyed or channeled tubular tool attachment portion adjustably extending from the base tube portion. The distal end of the tool attachment portion includes an externally threaded attachment, preferably having an Acme thread pattern in order to fit the vast majority of tool accessories available. This threaded end portion may include a concentric internal threaded passage, for installing externally threaded components as desired.

The distal end of the tubular handle portion has an inwardly folded tab or tang which projects into the interior of the tube. This folded down portion engages the keyway or channel of the smaller diameter tube which telescopes within the outer tube, precluding rotation of the smaller extension tube axially within the outer tube in order to maintain the desired alignment of any tool accessories secured to the distal end of the extension tube. A pull release locking pin is provided at the distal end of the tubular base portion, with the pin projecting through the tube and selectively engaging one of a series of latch holes in the extension tube to lock the length of the assembly as desired.

Accordingly, it is a principal object of the invention to provide a telescopically adjustable extension pole for tools and accessories, such as paint rollers, squeegees, cleaning brushes and brooms, etc.

It is another object of the invention to provide such an extension pole with the base or handle portion comprising an elongate cylindrical tubular component and the extendible tool attachment portion comprising a longitudinally keyed smaller diameter tube having a relatively thicker wall than the outer tube, which telescopes within the cylindrical base portion of the device.

It is a further object of the invention to provide an extension pole including an externally threaded distal end on the smaller diameter extension tube for universal attachment of various tool heads or accessories thereto, with the externally threaded attachment preferably including an internally threaded hole for further versatility.

Still another object of the invention is to provide an extension pole including a pull lock pin for adjusting the collective length of the assembly, and means for precluding axial rotation of the extension tube within the base tube.

It is an object of the invention to provide improved elements and arrangements thereof for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a telescopically adjustable extension for use with various tool heads or accessories, such as paint rollers, squeegees, cleaning brushes and brooms, etc., as desired. The present extension device is particularly well adapted for use with the majority of such tool heads or accessories which are equipped with internally threaded sockets with Acme threads, by means of the mating externally threaded end fitting which provides nearly universal attachment for a wide range of accessories thereto.

Figure 1:
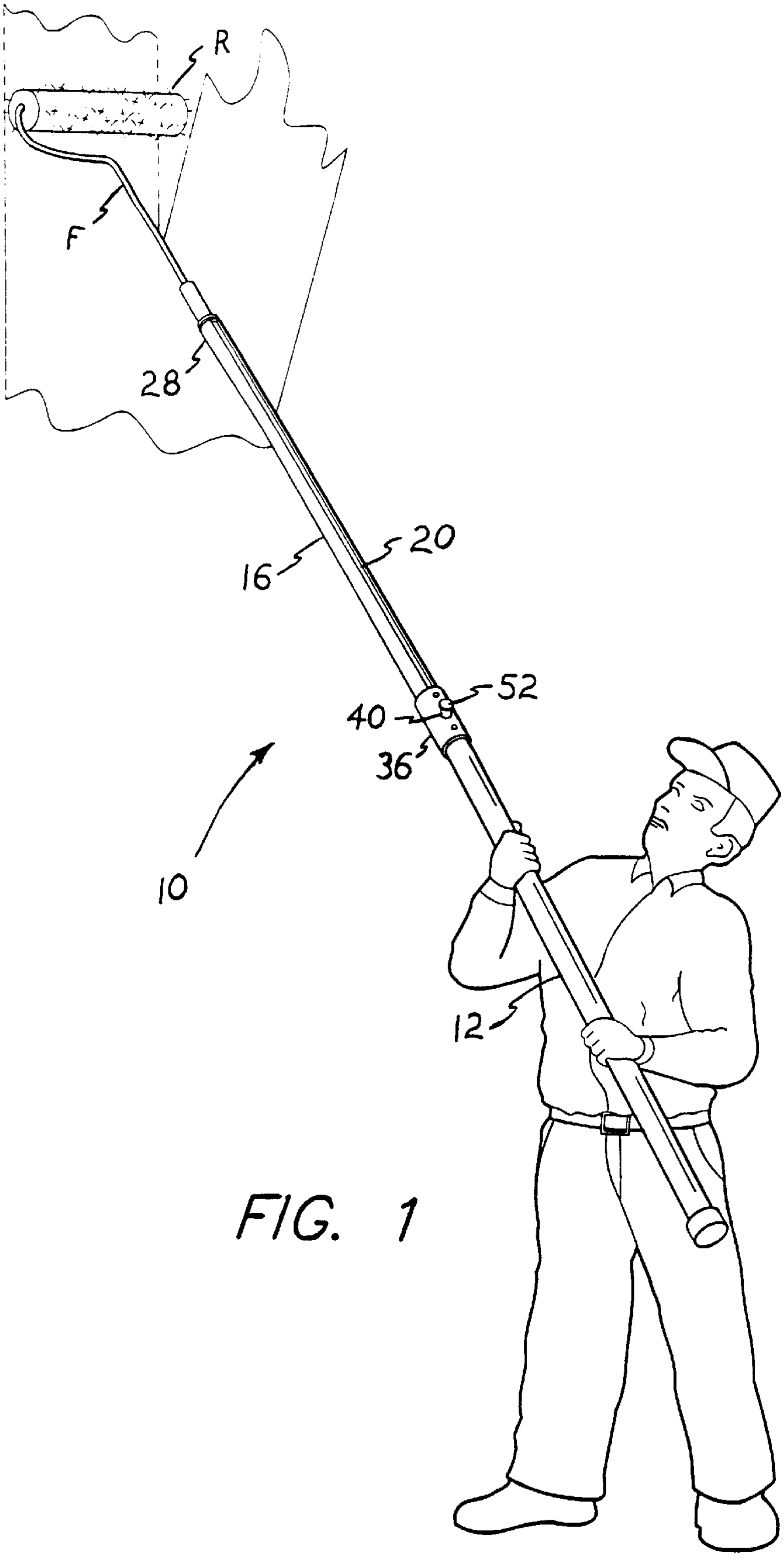
FIG. 1 is an environmental, perspective view of an extension pole for tools according to the present invention, showing its general features and use.

FIG. 1 provides an environmental perspective view of the present extension pole 10 in use in painting a relatively high area which cannot be reached directly with a hand held roller or brush. While the pole 10 of FIG. 1 is shown as an extension for a paint roller R, it will be seen that the present extension pole 10 may be used with a wide array of different tools and equipment as desired.

Figure 2:
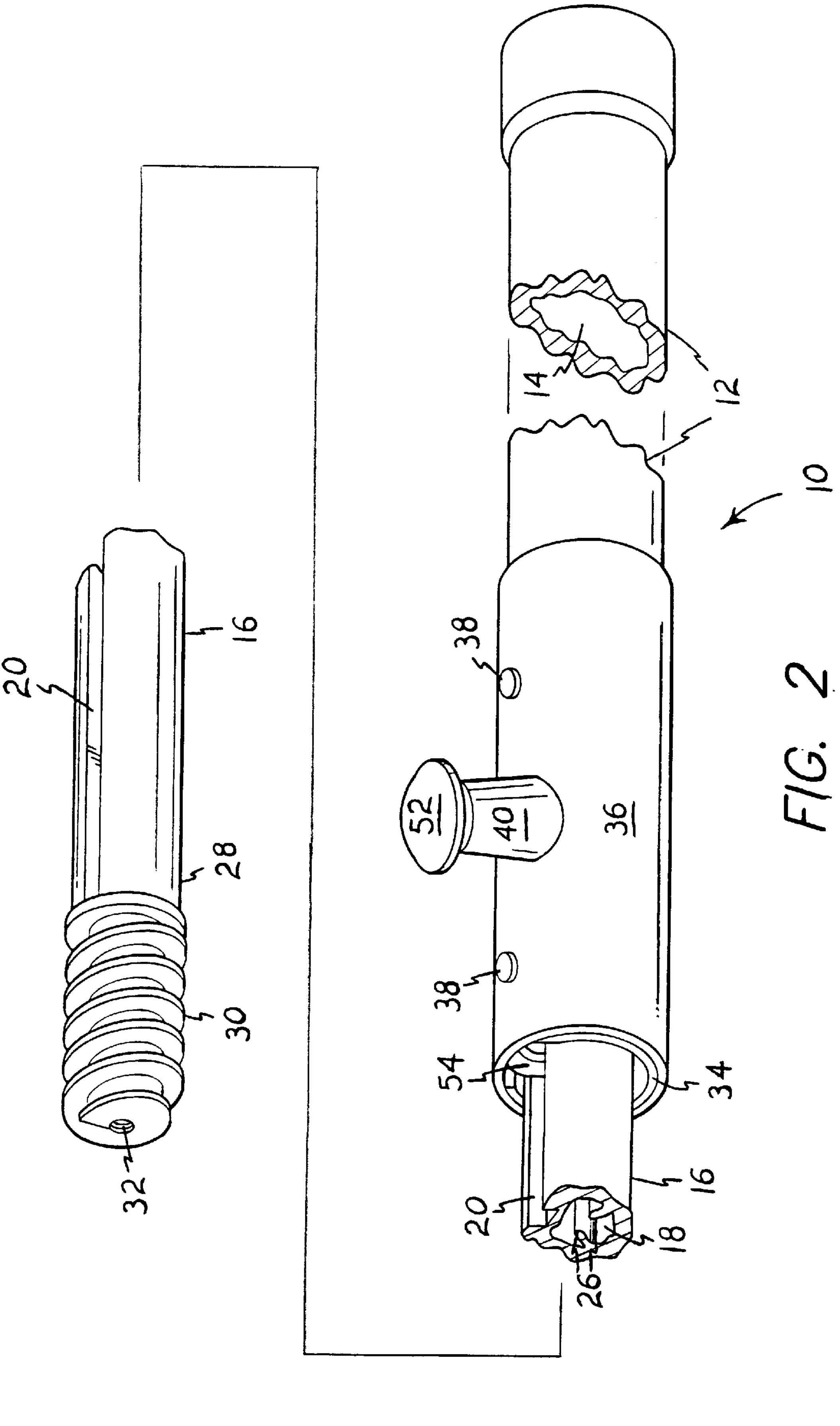
FIG. 2 is an exploded detail perspective view of the distal end of the tubular handle portion with the smaller diameter extension tube installed therein and the distal end of the extension tube, showing details thereof.

The present extension pole 10 essentially comprises an elongate, tubular base or handle portion 12 with a hollow interior 14, as shown in FIG. 2 of the drawings. An elongate, tubular extension portion 16 having a smaller diameter than the handle portion 12, telescopes within the handle 12 to extend the distal end of the extension portion 16 as desired. The extension portion 16 is preferably formed as an extrusion, with a hollow interior 18 (shown in FIGS. 2 through 4) and a longitudinally disposed keyway 20 formed externally along one side thereof.

The extruded extension 16 provides an additional advantage over relatively thin walled tubular elements, in that the extrusion wall has a relatively greater thickness 22 than the wall thickness 24 of the larger diameter handle portion 12 of the present pole 10 (shown in FIG. 3), in addition to having some internal stiffeners 26 or longitudinal ribs inside the extension pole 16 formed with the remainder of the extruded shape for added strength and rigidity. The relatively thicker extrusion wall in comparison to the wall of the larger diameter base or handle component 12, as well as stiffeners 26, provides additional rigidity for the extension pole 16 to resist bending, which bending resistance could not be achieved with a smaller diameter tube having the same wall thickness as the larger diameter base pole 12.

The extension pole 16 telescopes adjustably within the larger diameter base or handle pole 12, as described above, for adjustably extending the distal end 28 of the extension pole 16, and any tool secured thereto, as desired to provide a variable total length for the extension assembly 10 for reaching otherwise difficult to access areas. The distal end 28 of the extension section 16 is provided with an externally threaded pin 30 secured thereto (riveted, etc.) and extending concentrically therefrom, as shown in FIG. 2, preferably comprising a male or externally threaded section having Acme threads thereon. The Acme thread configuration provides greater strength than a conventional V-shaped thread to withstand compressive forces exerted on a tool placed on the end of the pole 10 and is an essentially universal standard for the removable attachment of various tool heads (push brooms, paint rollers, brushes, etc.) to various handles, and the provision of Acme threads at the distal end 28 of the extension portion 16 provides greater versatility for the present extension pole 10 than other configurations. Additional versatility is provided by means of an internally threaded passage 32 formed within the end of the externally threaded pin 30, for the threaded attachment of other articles thereto, e. g., paint roller frames F (FIG. 1) having externally threaded rod ends, etc.

Figure 3:
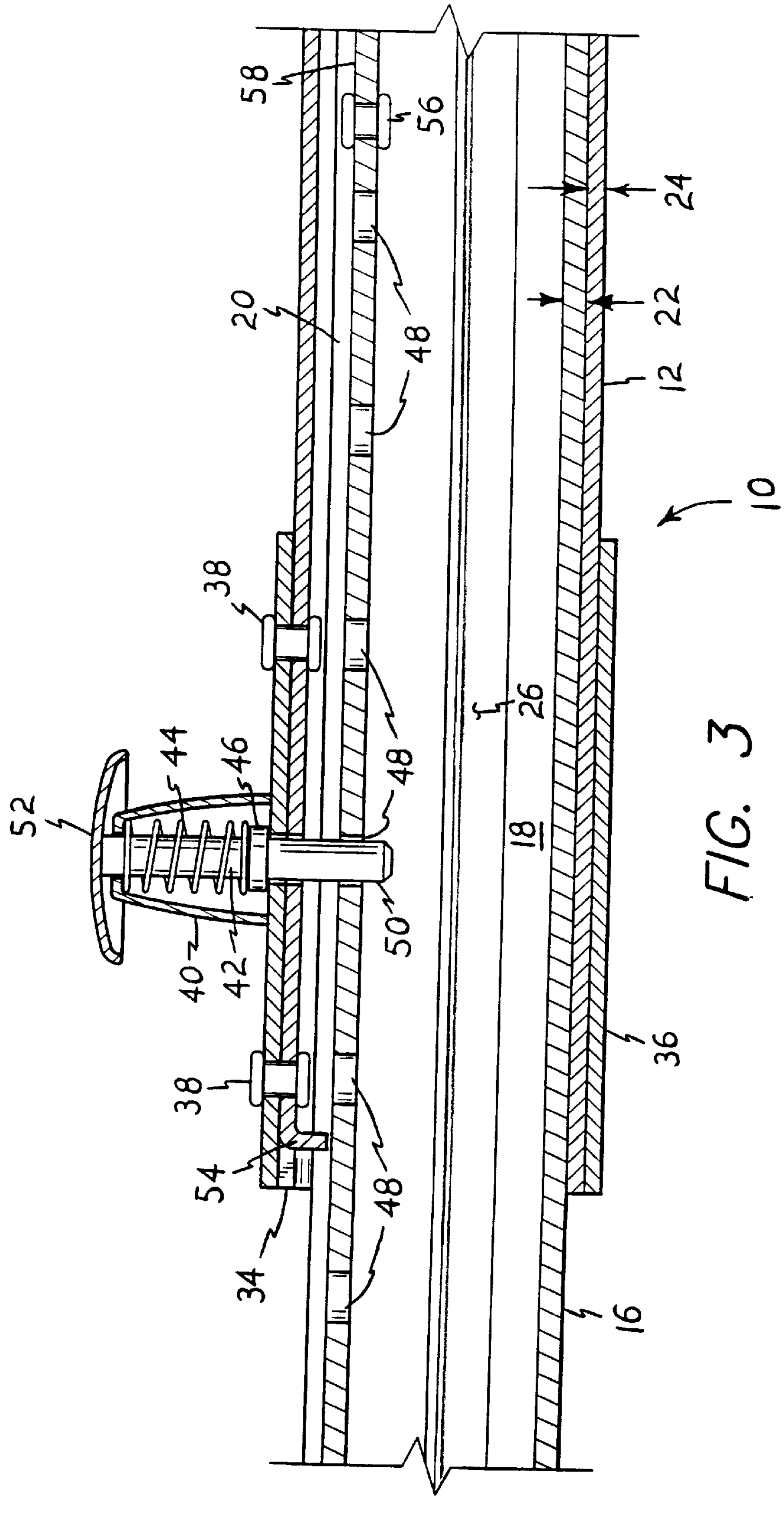
FIG. 3 is a detail side elevation view in section of the mechanism for locking the extension tube portion of the assembly as desired.
Figure 4:
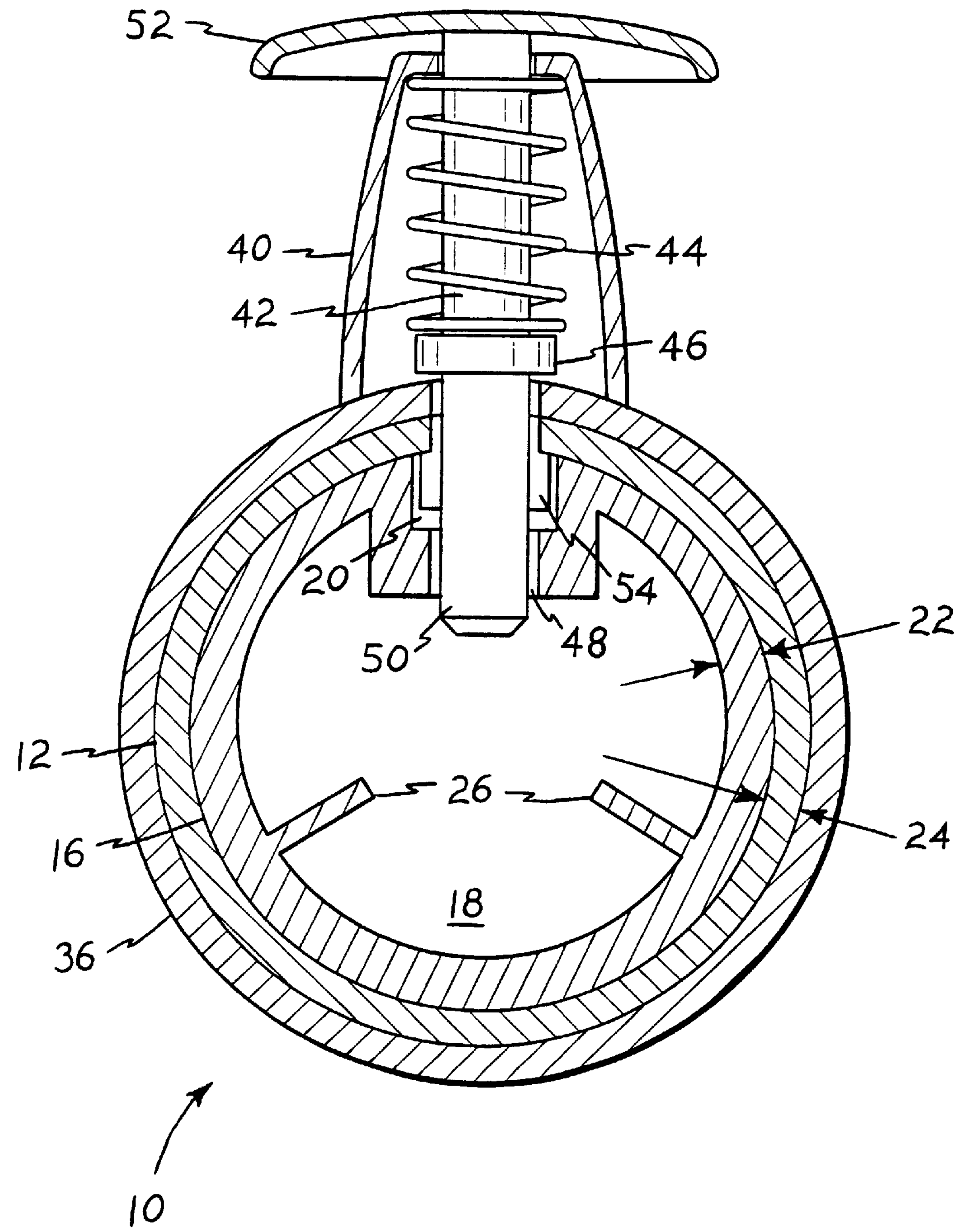
FIG. 4 is a detail end elevation view in section of the mechanism of FIG. 3, at right angles to the orientation of the FIG. 3 view.

The distal end 34 of the base or handle portion 12 includes means for adjustably and positively locking the extension portion 16 relative to the handle portion 12, and thus adjusting the overall total length of the extension pole 10 as desired. FIGS. 2 through 4 of the drawings illustrate this locking means in detail.

A concentric collar or sleeve 36 is secured to the distal end 34 of the handle portion 12 of the extension assembly 10, as by rivets 38 or other suitable means. The rivets 38 are aligned with the keyway 20 of the extension section 16, thus avoiding any interference with the movement of the extension 16 within the concentric outer handle portion 12 of the assembly. The sleeve 36 includes a radially disposed, tubular locking pin housing 40 extending therefrom, with a locking pin 42 and lock pin retainer spring 44 housed concentrically therein. The lock pin 42 is urged to an extended or latched position, i. e., radially inwardly toward the axial center of the assembly, by the compression of the spring 44 acting between the outer or distal end of the lock pin housing 40 and a collar 46 affixed circumferentially about the lock pin 42.

The floor of the extension tube keyway 20 includes a series of lock pin holes 48 formed therethrough, with the distal end 50 of the lock pin 42 selectively engaging any one of these holes 48 as desired by the worker using the extension pole 10. Preferably, a fairly large number of lock pin holes 48 is provided along the extension keyway 20, to provide a fine degree of adjustability for the assembly 10. Spacing the lock pin holes or passages 48 every three inches (more or less) has been found to provide reasonable adjustability for the present extension 10. While this principle does not provide infinite adjustability, as does a concentric collet arrangement, the present locking means provides much more positive locking for the assembly, and is capable of handling compressive or tensile forces exceeding one hundred pounds.

Adjustment of the above described assembly is accomplished by lifting the lock pin release button 52, i. e., pulling it radially outwardly away from the above described locking assembly. This compresses the spring 44 between the outer end of the lock pin and spring housing 40 and the lock pin collar 46, and also withdraws the distal end 50 of the pin 42 from its engagement with one of the lock pin passages or holes 48 in the floor of the keyway 20 of the extension arm portion 16. The extension tube 16 may then be telescoped concentrically within the outer handle tube 12 to extend or retract the extension tube 16 relative to the handle portion 12 as desired. Once the assembly has been adjusted to approximately the desired position, the release button 52 may be released, with the spring 44 urging the distal end 50 of the lock pin 42 to bear against the floor of the keyway 20. Some slight additional adjustment of the extension portion 16 relative to the handle portion 12 will position one of the lock pin holes 48 in registry with the lock pin 42, with the spring 44 pushing the lock pin 42 into place to lock the assembly at the desired extended length.

It will be seen that the two concentric tubes comprising the present extension pole invention, will rotate axially relative to one another unless some means is provided to preclude such relative rotation. Accordingly, the distal end 34 of the base pole 12 is provided with a tab or finger 54 which is formed by an axial cut along each side thereof, with the spacing of the cuts essentially equal to the width of the extension portion keyway 20, and then folding the tab 54 inwardly toward the axial center of the assembly.

The inwardly folded tab 54 thus engages and fits closely within the keyway 20 of the extension arm portion 16, as shown in FIGS. 2 through 4 (clearances are exaggerated, for clarity in the drawing Figures) to preclude the extension portion 16 from rotating within the concentric outer base or handle portion 12. This allows a worker to hold the base or handle portion 12 of the assembly 10 at the desired orientation, with assurance that a tool (e. g., paint roller R, etc.) which has been temporarily secured to the distal end 28 of the extension arm 16, will remain in the same orientation. By preventing rotation of the extension pole 16 within the base pole 12, the guide tab 54 and channel 20 assembly also assures that the row of holes 48 is always linearly aligned with the lock pin 42, so that the extension pole 16 does not have to be rotated to align a hole 48 with the pin 42.

Means are also provided to preclude excessive extension of the distal extension arm portion 16 relative to the base or handle portion 12 of the assembly 10. FIG. 3 of the drawings illustrates a stop pin 56 (rivet, screw, tab, etc.) secured through the floor of the extension arm keyway 20 near the proximal end 58 of the extension arm 16. This stop pin 56 extends radially outwardly from the keyway 20 floor a sufficient height to engage the alignment tab 54 of the distal end 34 of the outer handle tube 12, when the extension arm 16 is extended to the point that the proximal end 58 of the extension arm 16 approaches the distal end 34 of the handle tube 12. Thus, while the extension tube 16 is free to slide axially within the outer handle tube 12 to any position desired once the lock pin 42 has been pulled to disengage the pin 42 from any of the locking holes 48, the extension tube 16 cannot extend in any case beyond the point where the stop pin 56 engages the alignment tab 54.

In conclusion, the present extension pole invention provides significant economic and structural improvements over other such devices of the prior art. Economic improvements are provided by the means for maintaining the axial alignment of the two tubes, by bending down an alignment tab from the distal end of the outer tube to engage the keyway of the inner tube. This is easily accomplished during manufacture and requires no additional parts or equipment, thus significantly reducing the cost of manufacture for the present extension pole. Structural improvements are achieved by means of the extruded extension portion of the assembly, with its relatively thicker walls and internal stiffening webs. As a keyway is required in any event for alignment of the two components, the provision of an extrusion with the required keyway, with the extrusion also including heavier or thicker walls than the larger diameter outer tube component, serves to provide the additional strength required of the smaller diameter tube portion of the assembly. The present extension pole will thus find widespread use among painters, window cleaners, janitorial staff, and any others who have need for a sturdy, yet economical, extension device.

It is to be understood that the present invention is not limited to the embodiment described above, but encompasses any and all embodiments within the scope of the following claims.

We claim:

1. An extension pole for tools, comprising:

an elongate, tubular handle portion having a hollow interior, the handle portion having a distal end;

an elongate, tubular extension portion having a hollow interior and a longitudinally disposed external keyway, the keyway having a floor, a plurality of spaced apart lock pin holes being defined in the floor;

said extension portion having a thicker wall than said handle portion and having a plurality of stiffener ribs extending longitudinally in the interior of said extension portion, for resisting bending of said extension portion;

said extension portion telescopingly disposed within said handle portion for selectively adjusting said extension portion relative to said handle portion as desired, with said handle portion and said extension portion defining a variable total length;

said extension portion having a proximal end slidably disposed in said handle portion and having a distal end;

lock pin assembly, including:

a cylindrical sleeve permanently attached to the distal end of said handle portion;

a lock pin housing extending radially from said sleeve;

a lock pin having a shaft extending through said lock pin housing and through said sleeve, the lock pin having a button at one end of the shaft disposed outside of said lock pin housing and having a collar disposed about the shaft inside said lock pin housing; and a helical compression spring concentrically disposed around the lock pin shaft between the lock pin housing and the lock pin collar, the spring biasing the lock pin shaft against the floor of the keyway and through one of the holes defined in the keyway;

a tab integral with and extending from the distal end of said handle portion into the keyway, the tab preventing rotation of said extension portion relative to said handle portion and maintaining said lock pin in alignment with the keyway;

a stop pin at the proximal end of said extension portion extending into the keyway, said stop pin engagable with said tab in order to prevent the proximal end of said extension portion from separating from said handle portion; and a threaded pin extending from the distal end of said extension portion, the threaded pin having Acme external threads for attachment of a tool having an internally threaded fitting, and having an internally threaded bore defined therein for attachment of a tool having an externally threaded fitting.

* * * * *